US 6,678,567 B1

(12) United States Patent
Haendel

(10) Patent No.: US 6,678,567 B1
(45) Date of Patent: Jan. 13, 2004

(54) PILOT INPUT DEVICE TO CONTROL DIRECTION, ALTITUDE, AND SPEED OF AIRCRAFT

(75) Inventor: Richard S. Haendel, Iowa City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 593 days.

(21) Appl. No.: 09/607,001

(22) Filed: Jun. 29, 2000

(51) Int. Cl.[7] ............................................. G05B 15/00
(52) U.S. Cl. ..................... 700/85; 700/84; 244/221; 244/177; 244/237; 244/76 J
(58) Field of Search .............................. 700/84, 85, 17, 700/83; 244/220–221, 177, 76 J, 76 B, 237

(56) References Cited

U.S. PATENT DOCUMENTS

| | | | | |
|---|---|---|---|---|
| 5,113,714 A | * | 5/1992 | Eklund et al. ......... 74/471 XY |
| 5,687,080 A | * | 11/1997 | Hoyt et al. .................... 700/85 |
| 5,959,863 A | * | 9/1999 | Hoyt et al. .................... 700/85 |
| 5,999,168 A | * | 12/1999 | Rosenberg et al. ......... 345/161 |
| 6,025,831 A | * | 2/2000 | Gardiner ..................... 345/157 |
| 6,089,501 A | * | 7/2000 | Frost .............................. 244/8 |
| 6,147,674 A | * | 11/2000 | Rosenberg et al. ......... 345/157 |

* cited by examiner

Primary Examiner—Ramesh Patel
(74) Attorney, Agent, or Firm—Nathan O. Jensen; Kyle Eppele

(57) ABSTRACT

An integrated side stick controller combines air speed, turning and altitude changing rate control into one pilot input control device. Movements of the integrated side stick controller will perform manipulations on aircraft surfaces devices in order to maneuver the aircraft. For instance, fore and aft movement of the side stick will increase/decrease the air speed, left/right movements of the side stick will control the turning of the aircraft, and up/down movements of the slider on the side stick will change the ascend/descend rate of the aircraft.

20 Claims, 2 Drawing Sheets

PILOT INPUT DEVICE TO CONTROL DIRECTION, ALTITUDE, AND SPEED OF AIRCRAFT

FIELD OF THE INVENTION

The present invention relates generally to systems for use in aircraft. More particularly, the present invention relates to an improved pilot input control system for use by pilots to control various control functions of an aircraft.

BACKGROUND OF THE INVENTION

The complexity of avionics systems has increased greatly over the years. The complexity, while necessary, has considerably increased a pilot's work load. Heavy pilot workload decreases the pilot's situational awareness, thereby compromising the safety of the aircraft. Thus, there is a constant need to improve controls of aircraft systems in order to reduce the pilot work load. In addition, safety and training of pilots are concerns in improving avionics systems.

Currently, control of aircraft air speed, altitude change rate and turning requires the use of multiple pilot input control devices. Prior art pilot input control devices have throttle control separated from the altitude and turning controls. Aircraft dynamic control involving changes in airspeed, altitude change rate and turning requires a number of steps to be completed by the pilot. For example, when a pilot causes an aircraft to ascend, air speed is reduced. In order to maintain the air speed, the pilot must increase the throttle, usually located separate from the ascension control. In some situations, air speed may reduce to a point where the aircraft begins to stall and fall to the ground. This may cause the pilot to lose control of the aircraft. In addition, new pilots have difficulties learning how to compensate the various controls for different changes in navigation.

Therefore, there is a need to improve aircraft controls in order to reduce pilot work load, improve safety and improve the training of pilots.

SUMMARY OF THE INVENTION

The present invention is an improved pilot aircraft control interface. More particularly, an integrated side stick controller is provided that controls air speed, turning and altitude change rate. Movements of the integrated side stick controller perform manipulations on engine control and aircraft surface devices in order to control the aircraft. For instance, fore and aft movement of the side stick will increase/decrease the air speed, left/right movements of the side stick will turn the aircraft, and up/down movements of the slider on the side stick will change the ascend/descend rate of the aircraft.

In addition, the controls are integrated by a aircraft control system to decrease the pilot work load. For example, a pilot can set a desired ascension rate and air speed that will be maintained by the aircraft control system without further input from the pilot. It follows that a pilot may change the rate of ascension without sacrificing air speed.

DETAILED DESCRIPTION OF AN ILLUSTRATIVE EMBODIMENT

Figure 1:
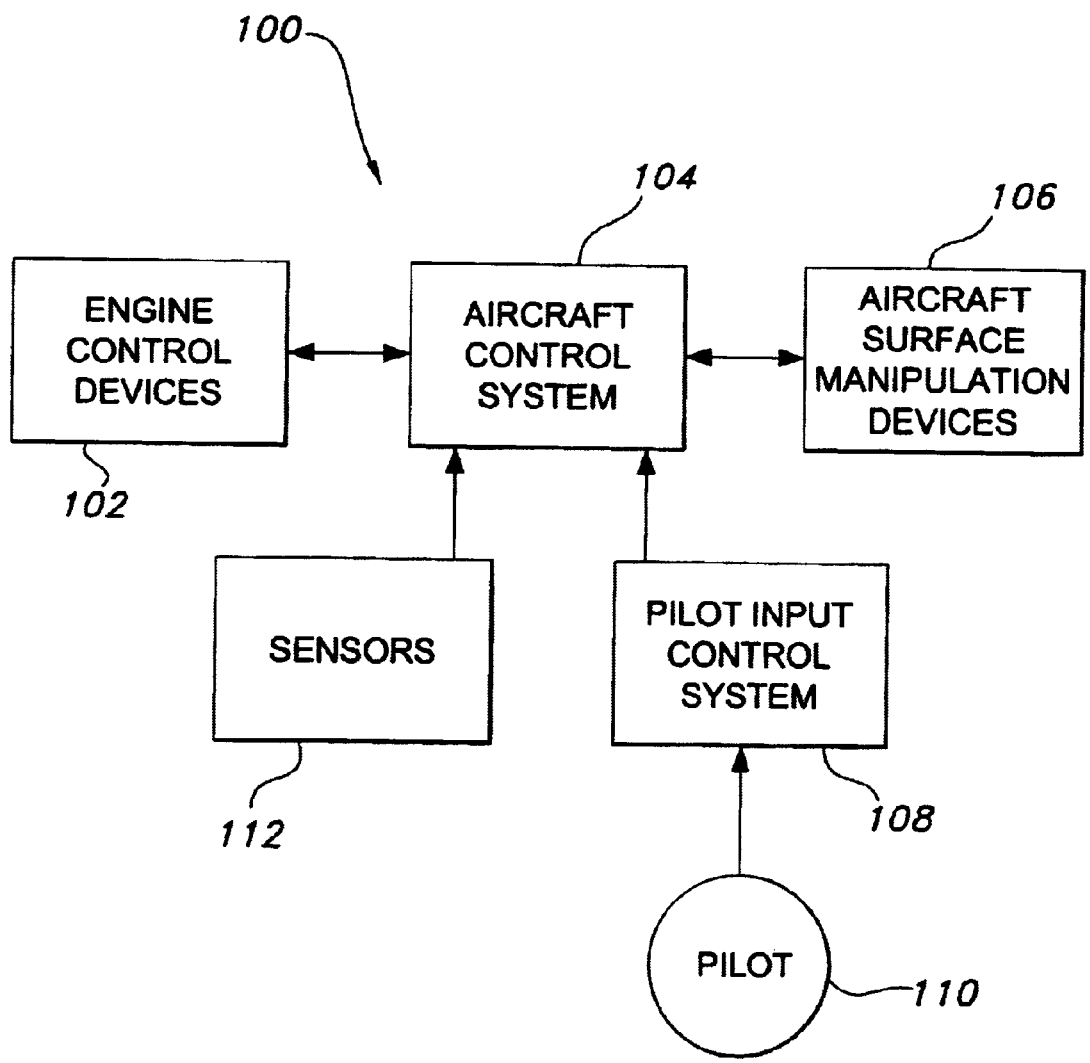
FIG. 1 is a schematic drawing of a avionics system in accordance with the present invention.

FIG. 1 shows an aircraft system 100 as used in the present invention. The aircraft system 100 shown can be either a fly-by-cable (mechanical manipulation of engine controls and aircraft surface devices) or a fly-by-wire (electrical manipulation of engine controls and aircraft surface devices) system.

Engine control devices 102 and aircraft surface manipulation devices 106 physically control the flight control surfaces based on inputs from the aircraft control system 104. Aircraft control system 104 is a controller comprised of at least one micro-processor (or other comparable circuitry) based system and can include a control data unit (CDU), flight management system (FMS) or other types of avionics suite controllers. Engine control devices 102 include devices and systems that generally control engine power of an aircraft, including throttles and other mechanisms. Aircraft surface manipulation devices 106 include ailerons, rudder, stabilizer, servo motors, etc. that generally control the attitude, angle of ascent or descent and other orientations of an aircraft.

Pilot input control system 108 interfaces between pilot 110 and aircraft control system 104. Pilot input control system 108 includes input devices used by the pilot to control various functions of the aircraft. Accordingly, pilot 110 uses pilot input control system 108 in order to maneuver the aircraft. Pilot input control system 108 sends output signals to aircraft control system 104 as a function of the inputs from pilot 110. The aircraft control system 104 will interpret the inputs of pilot 110 through pilot input control system 108. Sensors 112 include devices to sense aircraft speed, ascension or descension rate, and may also include sensors to sense turning rate. Sensors 112 provide feedback to aircraft control system 104 to stabilize the aircraft at the commanded input. Aircraft control system 104 then sends signals to the corresponding device depending on the pilot input. For example, if pilot 110 manipulates pilot input control system 108 to turn left, the aircraft control system 104 will manipulate the necessary ailerons, rudder and stabilizer to achieve this result, and adjust engine power via device 102 as necessary. Aircraft control system 104 is also designed to integrate outputs from pilot input control system 108 so pilot workload is reduced. For example, if the ascend rate of the aircraft is increased by pilot 110 using input to pilot input control system 108, in addition to aircraft manipulation devices, aircraft control system 104 will also manipulate engine control devices 102 so that airspeed is maintained according to pilot input.

Figure 2A:
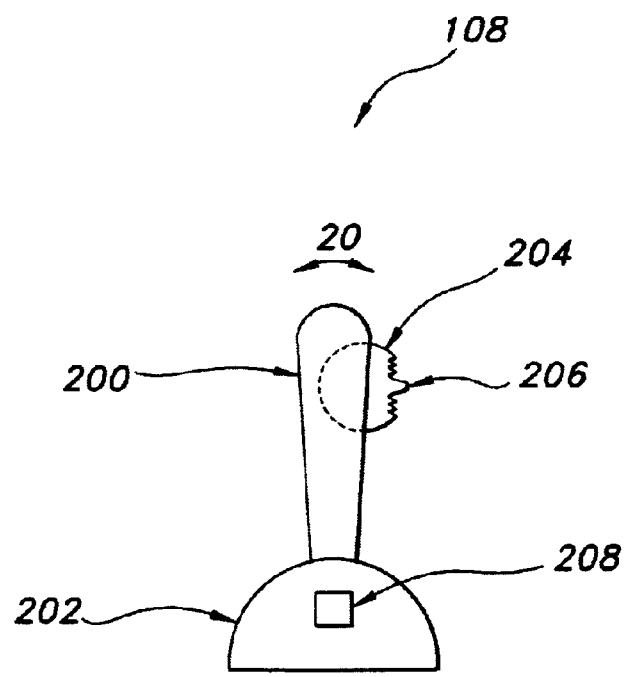
FIG. 2A is a side view representation of the pilot input control system in accordance with the present invention.

FIG. 2A shows an embodiment of pilot input control system 108 in accordance with the present invention. Pilot input control system 108 can be located directly in front or to one side of the pilot and includes stick 200, base 202, knob 204, detent 206 and position biasing device 208. Base 202 is substantially fixed to the aircraft. Stick 200 is coupled to base 202 in order to provide two degrees of movement, fore/aft movements and left/right movements. In addition, the left/right direction of the stick is spring loaded using biasing device 208 in order to return the stick to a reference position when released by the pilot. However, after movement of stick 200 to a particular fore/aft position, the stick will remain in the particular fore/aft position when released by the pilot.

Fore and aft movements of stick 200 will travel generally in the direction of arc 20. Moving the stick fore and aft controls the air speed of the aircraft through aircraft control system 104 (shown in FIG. 1). Output signals from the pilot input control system 108 are interpreted by the aircraft control system 104 in order to achieve the desired result. When pushing the stick forward, the air speed of the aircraft increases and when pulling the stick back, the speed of the aircraft decreases. Since stick 200 will remain in the same fore/aft position when released by the pilot, air speed is easily maintained.

Figure 2B:
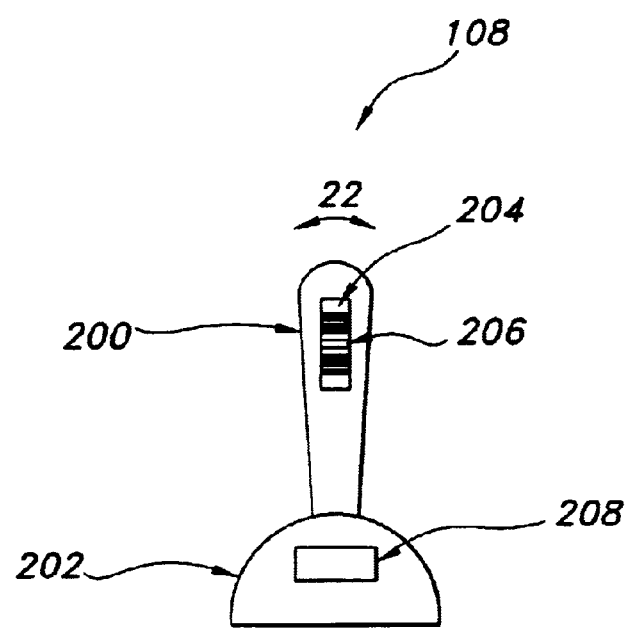
FIG. 2B is a rear view representation of the pilot input control system in accordance with the present invention.

FIG. 2B shows a rear view (the view typically seen by the pilot) of pilot input control system 108. Bias device 208, which can be a spring or other types of positional biasing device that provide spring loaded characteristics for the left and right movements of stick 200, is more clearly shown. Left and right movements of stick 200 will travel generally in the direction of arc 22. Pushing the stick to the left will cause the aircraft to turn to the left and pushing the stick to the right will cause the aircraft to turn right. Movement of the stick will result in pilot input control device 108 sending output signals to aircraft control system 104 in order to achieve the desired result. Spring or other tension device 208, diagrammatically shown, will return stick 200 to a central reference position when released by the pilot. The release by the pilot of stick 200 will stop the turn in progress and will return the aircraft to a straight forward direction of travel.

Knob or slider 204 can be integrated into stick 200 and is also part of pilot input control system 108. Knob 204 can be a wheel, slider, button or any other device with multiple incremental positions. Using knob 204, the pilot can change the rate at which the aircraft ascends of descends depending on the up and down movements of knob 204. If the pilot pushes knob 204 to an upward position, the aircraft surfaces and engines are controlled by aircraft control system 104 such that the aircraft will ascend at a rate corresponding to the upward position of knob 204 while maintaining its previously selected airspeed. Thus, if knob 204 is pushed up to its maximum upward position, this will cause the aircraft to ascend at a greater rate than if only pushing knob 204 up slightly. Likewise, if the pilot pushes knob 204 to a downward position, the aircraft surfaces and engines are controlled by aircraft control system 104 such that the aircraft will descend at a rate corresponding to the downward position of knob 204. Thus, if knob 204 is pushed to its maximum downward position, this will cause the aircraft to descend at a greater rate than if only pushing knob 204 down slightly, while maintaining its present airspeed.

The altitude change rate will be maintained by aircraft control system 104 (shown in FIG. 1) depending on the position in which knob 204 is placed. In addition, detent 206 is provided on knob 204 to provide a tactical indication to the pilot of the position in which knob 204 should be placed for level flight. Persons skilled in the art will appreciate that any type of indicator will suffice to replace detent 206 to reference the level flight placement for knob 204. Since air speed and altitude change rate are integrated in one device controlled by aircraft control system 104, a pilot is able to maintain a constant air speed while changing the altitude of the aircraft.

Although the present invention has been described with reference to illustrative embodiments, workers skilled in the art will recognize that changes may be made in form and detail without departing from the spirit and scope of the invention.

What is claimed is:

1. An integrated pilot input device for use by a pilot to provide signals to an aircraft control system, the integrated pilot input device comprising:

a stick with two degrees of movement and adapted to provide output signals to the aircraft control system to control air speed when the stick is moved fore and aft and to turn the aircraft when the stick is moved left and right;

a knob positioned on the stick, and having a plurality of positions, that provides output signals to the aircraft control system to control the ascend and descend rate of the aircraft according to a position of the knob.

2. The integrated pilot input device of claim 1 wherein the stick includes a bias mechanism to return the side stick to a left and right reference position when released by the pilot.

3. The integrated pilot input device of claim 2, wherein the stick is adapted to remain in its current fore and aft position, when released by the pilot, to maintain an airspeed.

4. The integrated pilot input device of claim 1 wherein the knob includes an indicator that references a knob position which corresponds to level flight of the aircraft.

5. The integrated pilot input device of claim 4 wherein the indicator is a detent providing tactical feedback to the plot.

6. An aircraft control device configured to control aircraft air speed, turning, and altitude change rate, the device comprising:

positioning apparatus adapted to permit movement of a control member in a forward or backward position and to secure the control member in place when the control member is released by a pilot;

sensing apparatus adapted to detect a forward or backward position of the control member and to send a signal indicating an increase or decrease in aircraft speed based on the detected forward or backward position of the control member; and an input apparatus integrated into the control member and adapted to receive input from the pilot for rate of aircraft climbing or descending.

7. The device of claim 6, wherein the positioning apparatus is further adapted to permit movement of the control member in a left or right position and to return the control member to a central reference position from a left or right position.

8. The device of claim 7, wherein the sensing apparatus is further adapted to detect a left or right position of the control member and to send a signal indicating a left or right movement in the aircraft based on the detected left or right position of the control member.

9. The device of claim 7, wherein the central reference position corresponds to a straight and level position of flight.

10. The device of claim 7, wherein the positioning apparatus comprises a positional biasing device.

11. The device of claim 6, wherein the input apparatus is a knob having incremental positions.

12. The device of claim 6, wherein the input apparatus comprises a range of altitude change rate positions.

13. The device of claim 6, wherein the control member is a joystick.

14. An aircraft control device having control for aircraft speed and position, the control device comprising:

a joystick configured with two axes of movement, the two axes of movement being forward/backward and left/right, the forward/backward axis being configured to control aircraft air speed and the left/right axis being configured to control aircraft direction; and an input apparatus coupled to the joystick and being configured to receive input to control aircraft altitude.

15. The control device of claim 14, wherein the joystick is coupled to a number of mechanical apparatus in a fly-by-cable system.

16. The control device of claim 14, wherein the joystick is coupled to electrical controls in a fly-by-wire system.

17. The control device of claim 14, wherein the input apparatus is a rotatable knob.

18. The control device of claim 17, wherein the input apparatus includes incremental positions.

19. The control device of claim 18, wherein the incremental positions correspond to levels of flight.

20. The control device of claim 14, wherein the input apparatus is a rotatable member for selecting a level of flight.

* * * * *